United States Patent
Dehnicke et al.

(10) Patent No.: US 10,975,271 B2
(45) Date of Patent: Apr. 13, 2021

(54) ADHESIVE COMPOSITION FOR BONDING RUBBER TO METAL

(71) Applicant: Dow Global Technologies LLC, Midland, MI (US)

(72) Inventors: Stefan Dehnicke, Seeheim-Jugenheim (DE); Anna Osichow, Hofheim am Taunus (DE); Bernhard Krtsch, Raunheim (DE); Philipp Zutavern, Frankfurt (DE); Ernst List, Frankfurt (DE)

(73) Assignee: DDP Specialty Electronic Materials US, LLC, Wilmington, DE (US)

( * ) Notice: Subject to any disclaimer, the term of this patent is extended or adjusted under 35 U.S.C. 154(b) by 384 days.

(21) Appl. No.: 16/089,425

(22) PCT Filed: Apr. 3, 2017

(86) PCT No.: PCT/US2017/025712
§ 371 (c)(1),
(2) Date: Sep. 28, 2018

(87) PCT Pub. No.: WO2017/176625
PCT Pub. Date: Oct. 12, 2017

(65) Prior Publication Data
US 2019/0112509 A1  Apr. 18, 2019

Related U.S. Application Data

(60) Provisional application No. 62/317,851, filed on Apr. 4, 2016.

(51) Int. Cl.
*C09J 111/00* (2006.01)
*C09J 123/28* (2006.01)
(Continued)

(52) U.S. Cl.
CPC ............. *C09J 111/00* (2013.01); *C08K 5/32* (2013.01); *C08L 11/00* (2013.01); *C08L 21/00* (2013.01);
(Continued)

(58) Field of Classification Search
None
See application file for complete search history.

(56) References Cited

U.S. PATENT DOCUMENTS

| 2,835,624 A | 5/1958 | Cousins |
| 3,053,712 A | 9/1962 | Grabowski |

(Continued)

FOREIGN PATENT DOCUMENTS

| EP | 2045102 | 4/2009 |
| JP | 2006169266 | 6/2006 |
| WO | 2003033613 | 4/2003 |

OTHER PUBLICATIONS

JP2006169266 Abstract.
R. Nietzki, Fr. Kehrmann, Über Chinondioxim und Dinitrosobenzol, Berichte der Deutschen chemischen Gesellschaft zu Berlin, 1887, 20, p. 613-616.

*Primary Examiner* — Peter L Vajda
*Assistant Examiner* — Adrianna N Konves
(74) *Attorney, Agent, or Firm* — Andrew Bauer-Moore; Hong Xu (57) ABSTRACT

An adhesive composition is comprised of a film forming polymer, (ii) a lower crystallinity polynitroso compound, (e.g., poly-(1,4-phenylyenazine-N,N-dioxide)), (iii) a higher crystallinity polynitroso compound (e.g., poly-(1,4-phenylyenazine-N,N-dioxide)), and (iv) a carrier liquid. The composition is useful in bonding metal and rubber to make, for example, components to damp noise, vibration or harshness.

21 Claims, 4 Drawing Sheets

(51) Int. Cl.
- *C09J 123/34* (2006.01)
- *C08K 5/32* (2006.01)
- *C08L 23/34* (2006.01)
- *C08L 11/00* (2006.01)
- *C09J 115/02* (2006.01)
- *C08L 21/00* (2006.01)
- *C08K 3/04* (2006.01)

(52) U.S. Cl.
CPC .............. *C08L 23/34* (2013.01); *C09J 115/02* (2013.01); *C09J 123/28* (2013.01); *C09J 123/34* (2013.01); *C08K 3/04* (2013.01); *C08L 2205/02* (2013.01); *C08L 2205/03* (2013.01); *C08L 2312/00* (2013.01)

(56) References Cited

U.S. PATENT DOCUMENTS

| | | |
|---|---|---|
| 3,258,388 A | 6/1966 | Coleman et al. |
| 3,804,798 A | 4/1974 | Cantor |
| 3,878,134 A | 4/1975 | Ozelli et al. |
| 4,305,365 A | 12/1981 | Iizuka et al. |
| 4,308,365 A | 12/1981 | Czerwinski |
| 4,988,753 A | 1/1991 | Rullmann et al. |
| 5,028,654 A | 7/1991 | Wuest et al. |
| 5,282,638 A | 2/1994 | Harper |
| 5,478,654 A | 12/1995 | Hargis et al. |
| 5,534,591 A | 7/1996 | Ozawa et al. |
| 5,976,402 A | 11/1999 | Muller et al. |
| 8,466,226 B2 | 6/2013 | Hoy et al. |
| 2008/0124523 A1 | 5/2008 | Nohara et al. |

ADHESIVE COMPOSITION FOR BONDING RUBBER TO METAL

FIELD OF THE INVENTION

The invention relates to an adhesive composition especially suited for bonding rubber to metal and in particular bonding natural rubber, butadiene-styrene copolymer rubbers (GRS types), ethylene-diene-rubbers (EPDM), and isobutene-isoprene copolymer rubbers (Butyl).

BACKGROUND OF THE INVENTION

Poly-(1,4-phenyleneazine N,N-dioxide) (referred to herein as "p-PDNB" or "paradinitrosobenzene") is a well-known cross linker for rubber compounds and was described in 1887 by R. Nietzki, Fr. Kehrmann, Über Chinondioxim and Dinitrosobenzol, Berichte der Deutschen chemischen Gesellschaft zu Berlin, 1887, 20, p. 613-616. Paradinitrosobenzene or its nuclearly substituted derivatives such as those described in U.S. Pat. No. 3,258,388 when describing Poly-C-nitroso aromatic compounds have been used in adhesive compositions particularly for bonding natural rubbers to metal. These adhesive compositions typically combine p-PDNB with various halogenated polymers mixed with other components such as pigments like carbon black and or metal oxides that are dispersed in organic solvents or in water with surfactants such as described by U.S. Pat. Nos. 3,258,388 and 3,053,712. The compositions are applied to a substrate (e.g., metal) and dried. The rubber is then applied and covulcanized with the adhesive composition. During vulcanization the substrate is bonded to the substrate through the co-vulcanized adhesive composition.

Other particular adhesive compositions have been described requiring further additives such as particular polymers/monomers or other crosslinking/oxidizing compounds, for improving adhesion properties, or suitability with differing substrates or rubbers (see, for example, U.S. Pat. Nos. 2,835,624; 3,804,798; 4,305,365; 4,988,753; 5,028,654; 5,282,638; and 8,466,226.

It would be desirable for an adhesive composition useful to bond rubber to substrates such as metals having improved adhesion and applicability among substrates and rubbers, particularly non-halogenated rubbers (e.g., natural rubber).

SUMMARY OF THE INVENTION

A first aspect of the invention is an adhesive composition comprising, (i) a film forming polymer, (ii) an lower crystallinity polynitroso compound, (iii) a higher crystallinity polynitroso compound, and (iv) a carrier liquid. The adhesive composition surprisingly realizes improved adhesion compared to adhesion compositions employing only one of the components (ii) or (iii). In addition, the adhesive compositions may use various film forming polymers including non-halogenated polymers/rubbers and still achieve desired adhesion. In a particular embodiment, the adhesive composition realizes good adhesion between various substrates and natural rubber in the absence of further oxidizers or crosslinkers.

A second aspect of the invention is a method of bonding a substrate to rubber comprising, (i) applying a coating of the adhesive composition of the first aspect to a substrate, unvulcanized rubber or both, (ii) removing the carrier liquid to form an adhesive coating on the substrate, unvulcanized rubber or both, (iii) interposing the adhesive coating between the substrate and unvulcanized rubber forming an assemblage, (iv) heating the assemblage to a vulcanization temperature and for a time sufficient to vulcanize the unvulcanized rubber and the adhesive coating thereby bonding the rubber to the substrate. The method is particularly useful to bond natural rubber to a metal.

A third aspect of the invention is an article comprised of the assemblage after heating of the second aspect.

DETAILED DESCRIPTION OF THE INVENTION

The adhesive composition is comprised of a film forming polymer. The film-forming polymer is a polymer that forms a film when a layer of that polymer is applied to a substrate dispersed or dissolved within the carrier fluid. Typically, a layer of either a polymer solution in organic solvent or a waterborne composition containing a dispersed polymer is applied to a substrate, and the carrier fluid is removed, which conventionally is by drying either at room temperature (25° C.) or at elevated temperature (i.e., above 25° C., usually 100° C. or lower). The film forming polymer also generally has at least one group that may react with the nitroso group such as a carbon-carbon double bond.

Examples of suitable polymers, which may be used alone or in combination, include, an olefin polymer, which may be substituted or unsubstituted or a mixture thereof. Olefin polymers, also called polyolefins, include polymers based on monomer molecules that are unsaturated aliphatic hydrocarbons containing one double bond per molecule. Examples of such olefin polymers are polyethylene, polypropylene, polyisobutene, polybut-1-ene, poly-4-methylpent-1-ene, and the various copolymers thereof. Also included in the class of olefin polymers are polymers based on natural rubber and polymers based on synthetic rubber such as for example polyisoprene; polybutadiene; polymers of adducts of butadiene and cyclic conjugated dienes; copolymers of butadiene and styrene; copolymers of ethylene, propylene, and dienes; copolymers of acrylonitrile and butadiene; and the various copolymers thereof. Also included in the class of olefin polymers are the polymers described above that also include one or more multi-functional monomers to provide cross-linking.

The polyolefin may be halogenated. Halogenated polyolefins may have structures that are the same as those of unsubstituted polyolefins except that halogen atoms replace one or more of the hydrogen atoms. The halogens may be chlorine, bromine, fluorine, or a mixture thereof. The preferred halogens are chlorine, bromine, and mixtures thereof. The amount of halogen does not appear critical and can range from 3 to 70 percent by weight of the polymer.

The halogenated polyolefin desirably may be a substituted polydiene polymer (i.e., a polymer that has the structure of a polydiene polymer in halogen atoms are substituted for some hydrogen atoms). Suitable polydiene polymers include, for example, polybutadiene, polyisoprene, and mixtures thereof. Some suitable polydiene polymers have no monomer units that are not residues of diene molecules. In some embodiments, every halogenated olefin polymer in the adhesive composition is a substituted polydiene polymer in which no monomer units are other than residues of diene molecules.

The halogenated polyolefin may be substituted with bromine, which is a halogenated olefin polymer in which at least one halogen is bromine. A bromine substituted olefin polymer may or may not contain atoms of halogens other than bromine. Another halogenated polyolefin may be substituted with chlorine, which is a halogenated olefin polymer in which at least one halogen is chlorine. A chlorine substituted polyolefin may or may not contain atoms of halogens other than chlorine. One specific type of chlorine substituted olefin polymer is chlorinated polyolefin, which is an olefin polymer in which all the substituents are chlorine. One useful chlorinated polyolefin, for example, is chlorinated polyethylene (CPE).

Another example of a useful halogenated polyolefin is a mixed-halogen polyolefin, which is a halogenated polyolefin that has two or more different types of halogen atoms. In some embodiments, a mixed-halogen substituted olefin polymer is used that has chlorine and bromine. One suitable mixed-halogen substituted olefin polymer, for example, is brominated polydichlorobutadiene ("BPDCD").

In some embodiments, at least one halogenated polyolefin is used that has no substituent on the olefin polymer selected from nitrile, carboxyl, carboxylate ester, ether, peroxyester, or combination thereof. In some embodiments, every halogenated olefin polymer has no substituent on the olefin polymer selected from nitrile, carboxyl, carboxylate ester, ether, peroxyester, or combination thereof. In some embodiments, at least one halogenated olefin polymer is used that has no substituent on the olefin polymer other than halogen. In some embodiments, every halogenated olefin polymer in the adhesive composition has no substituent on the olefin polymer other than halogen.

Another useful film forming polymer is a halosulfonated polyolefin, which is a polymer that has the structure of unsubstituted olefin polymer in which some hydrogen atoms are replaced by halogen atoms and in which some other hydrogen atoms are replaced by sulfonyl halide groups, which have the chemical formula $SO_2X$, where X is a halogen atom. The halogens in the sulfonyl halide groups may be chlorine, bromine, fluorine, or a mixture thereof. In some embodiments, the halogens in the sulfonyl halide groups are chlorine, bromine, or a mixture thereof. In some embodiments, the halogen in the sulfonyl halide groups is chlorine. In some embodiments, every halogen in every sulfonyl halide group every halosulfonated olefin polymer is either chlorine or bromine. In some embodiments, every halogen in every sulfonyl halide group every halosulfonated olefin polymer in the adhesive composition is chlorine.

The substrate may be any substrate desired to be bonded to rubber. For example the substrate may be a synthetic or natural fabric; organic plastics such as polyolefins, polycarbonates, polyamides, polyimides and polyesters ceramics including inorganic glass; wood; and metal. The metal or ceramic may be any typically used in the production of automobiles, trains, busses, trucks and airplanes. Examples include ferrous based metals and alloys including steels, aluminum and alloys of aluminum, and magnesium and alloys of magnesium.

The rubber to be bonded to the substrate may be any rubber such as those known in the art. Generally the rubber may be any of the natural rubbers and olefinic synthetic rubbers including, for example, polychloroprene, polybutadiene, neoprene, butyl rubber, and halogenated butyl rubber. The adhesive is particularly useful in bonding natural rubber or rubbers comprised of natural or synthetic natural rubber, which may have other additives useful in vulcanizing the rubber described below.

The carrier liquid facilitates the formation of a coating of the adhesive composition on the unvulcanizable rubber, substrate or both. The carrier liquid may be an organic solvent or water. When the carrier liquid is an organic solvent it may solubilize one or more of the components in the adhesive composition, for example, it is generally desirable for the film forming polymer to be dissolved whereas the p-PDNB may be particulates dispersed therein. Examples of suitable organic solvents include aromatic hydrocarbons, such as benzene, toluene, xylene and the like, and the chlorinated aromatic hydrocarbons such as monochlorobenzene, dichlorobenzene and the like. Aliphatic hydrocarbons, chlorinated aliphatic hydrocarbons, ethers and/or alcohols may be used and in a particular embodiment may be used in small amounts (less than 10% by volume) of the carrier liquid such as those organic solvents just mentioned or water.

The adhesive composition may contain surfactants to disperse one or more components of the adhesive composition and are particularly useful when water is the carrier liquid. The surfactant may be any useful surfactant for dispersing one or more of the components such as an amphoteric, anionic, cationic, anionic or nonionic surfactant. Typically, the surfactant is anionic, nonionic or mixture of these. Some suitable nonionic surfactants, for example, are alkoxylates, copolymers of ethylene oxide and propylene oxide, and mixtures thereof. Among the suitable alkoxylates are, for example, ethoxylates, which have the structure where R is an aliphatic group, an aromatic group, an aliphatic-substituted aromatic group, and aromatic-substituted aliphatic group, or a mixture thereof; and x is from 5 to 200. In some embodiments R is alkyl-substituted benzene, with the structure R1-R2-, where R1 is a linear alkyl group and R2 is an aromatic ring. One suitable nonionic surfactant is nonylphenol ethoxylate.

Among embodiments in which nonionic surfactant is used, some suitable amounts of nonionic surfactant are, for example, 3 PHR or more; or 5 PHR or more; or 8 PHR or more. Independently, among embodiments in which nonionic surfactant is used, some suitable amounts of nonionic surfactant are, for example, 30 PHR or less; or 20 PHR or less; or 15 PHR or less. PHR means 100 times the ratio of the weight of that ingredient to the sum of the weights of all film-forming polymers in the adhesive composition. The weights are dry weights in that preclude any weight of the carrier liquid or water.

In some embodiments, the adhesive composition contains one or more anionic surfactant. Among embodiments in which anionic surfactant is used, some suitable amounts of anionic surfactant are, for example, 3 PHR or more; or 5 PHR or more; or 8 PHR or more. Independently, among embodiments in which anionic surfactant is used, some suitable amounts of anionic surfactant are, for example, 30 PHR or less; or 20 PHR or less; or 15 PHR or less.

In some embodiments, the amount of anionic surfactant in the composition of the present invention in 0.1 PHR or less; or 0.01 PHR or less. In some embodiments, no anionic surfactant is present.

Figure 1:
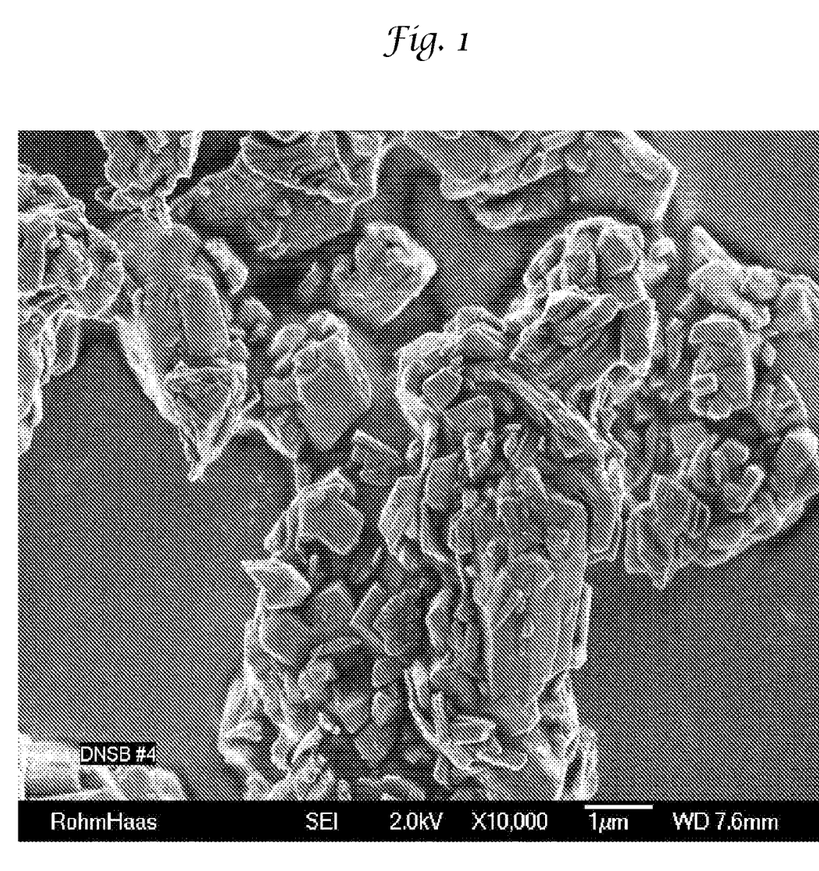
FIG. 1 is an electron micrograph of p-PDNB useful in the present invention and having higher crystallinity.
Figure 2:
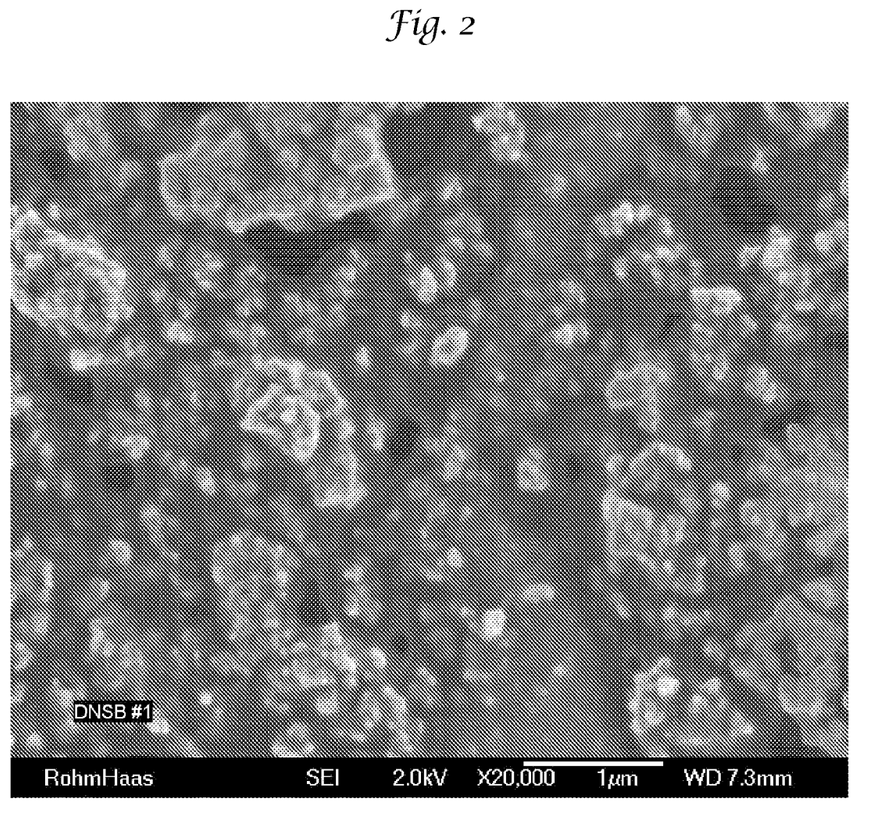
FIG. 2 is an electron micrograph lower crystallinity p-PDNB useful in the present invention and having lower crystallinity.
Figure 3:
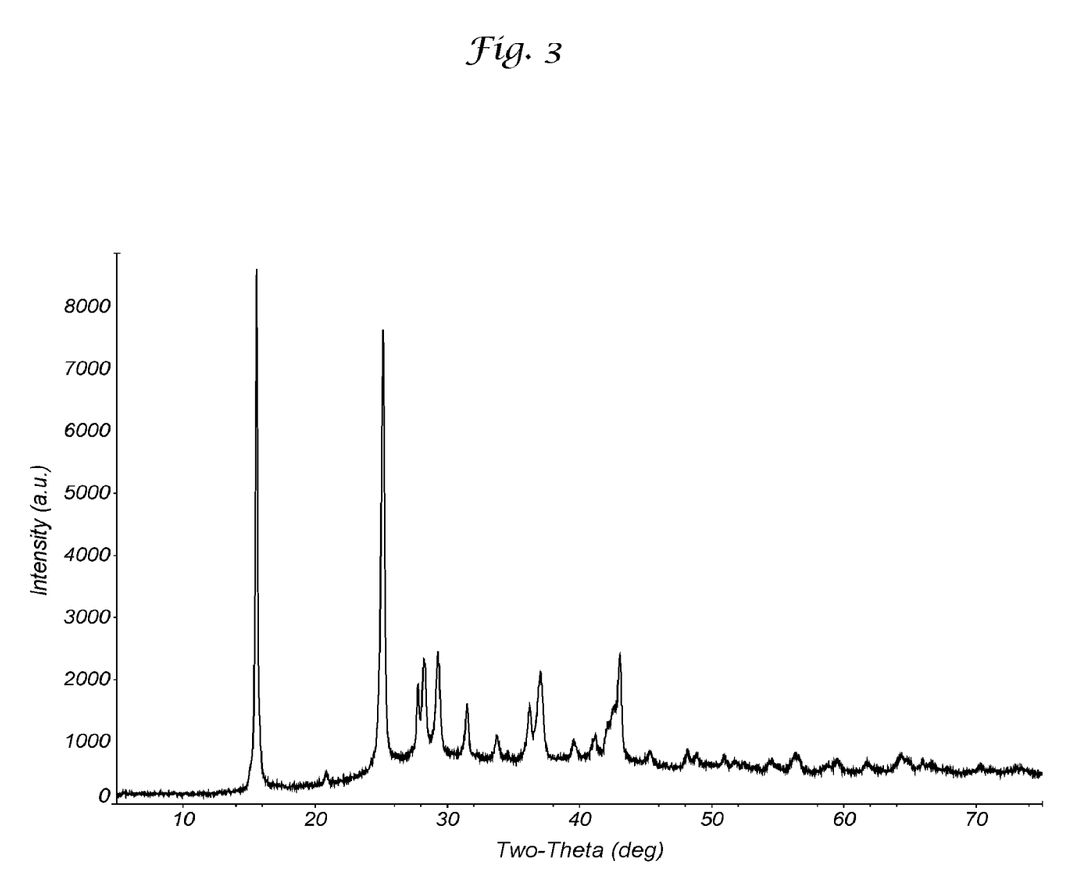
FIG. 3 is an X-ray diffraction pattern of the higher crystallinity p-PDNB shown in FIG. 1.

The adhesive composition is comprised of two polynitroso compounds wherein one has a lower crystallinity and the other has a higher crystallinity. In both of these there is an amorphous component that generally has no or minor ordered molecular structure and/or is of a very fine particulate size such that little or no order is detectable using typical analytical techniques such as X-ray diffraction. Crystalline herein means that there are distinct crystalline diffraction peaks exhibited in X-ray diffraction and generally the particulates of the higher crystallinity polynitroso compound exhibits faceting when observed microscopically (e.g., scanning electron microscopy) as is evident in FIG. 1 compared to FIG. 2 and correlates well with their respective X-ray diffraction patterns in FIGS. 3 and 4.

A polynitroso compound is an aromatic hydrocarbon containing at least two nitroso groups attached directly to non-adjacent nuclear carbon atoms. By "nuclear" carbon atom we mean a carbon atom that is part of an aromatic ring. Suitable aromatic compounds may have 1 to 3 aromatic nuclei, including fused aromatic nuclei. Suitable polynitroso compounds may have 2 to 6 nitroso groups attached directly to non-adjacent nuclear carbon atoms. Also included in the class of polynitroso compounds are the substituted polynitroso compounds, in which one or more hydrogen atoms attached to nuclear carbon atoms are replaced by organic or inorganic substituent groups, such as for example alkyl, alkoxy, cycloalkyl, aryl, aralkyl, alkaryl, arylamine, arylnitroso, amino, and halogen. In some embodiments, a composition of the present invention contains one or more polynitroso compounds with 2 nitroso groups.

Among embodiments in which one or more polynitroso compound is used, some suitable polynitroso compounds have the chemical formula $R_m$—Ar—$(NO)_2$, where Ar is phenylene or naphthalene; R is a monovalent organic radical having 1 to 20 carbon atoms, an amino group, or a halogen; and m is 0, 1, 2, 3, or 4. If m is greater than 1, the m R groups may be the same or different from each other. R is, in some embodiments, an alkyl, cycloalkyl, aryl, aralkyl, alkaryl, arylamine, or alkoxy radical with 1 to 20 carbon atoms; or R is, in some embodiments, an alkyl group with 1 to 8 carbon atoms. Independently, in some embodiments, the value of m is zero.

Some examples of suitable polynitroso compounds are m-dinitrosobenzene; p-dinitrosobenzene; m-dinitrosonaphthalene; p-dinitrosonaphthalene; 2,5-dinitroso-p-cymene; 2-methyl-1,4-dinitrosobenzene; 2-methyl-5-chloro-1,4-dinitrosobenzene; 2-fluoro-1,4-dinitrosobenzene; 2-methoxy-1,3-dinitrosobenzene; 2-benzyl-1,4-dinitrosobenzene; 2-cyclohexyl-1,4,-dinitrosobenzene; and mixtures thereof. In some embodiments, the one or more polynitroso compound used is selected from dinitrosobenzenes, substituted dinitrosobenzenes, dinitrosonaphthalenes, substituted dinitrosonaphthalenes, and mixtures thereof.

Also included in the class of polynitroso compounds are compounds as described above which exist in polymeric form, as described in Czerwinski, U.S. Pat. No. 4,308,365, and Hargis et. al., U.S. Pat. No. 5,478,654. In some embodiments, the one or more polynitroso compound used is selected from the polymeric form of p-dinitroso-benzene, the polymeric form of 1,4-dinitrosonaphthalene, and mixtures thereof. In some embodiments, the polymeric form of 1,4-dinitrosobenzene is used.

Generally, the polynitroso compound using poly-(1,4-phenyleneazine N,N-dioxide) ("p-PDNB") as an illustration may be manufactured in various ways by oxidizing para-chinondioxime (BQD) in water. Depending on the selected pH-value the manufacturing process results in poly-(1,4-phenyleneazine N,N-dioxide) (p-PDNB) with different morphology and crystallinity Typically, alkaline conditions result in p-PDNB that has substantially lower crystallinity ("lower crystallinity polynitroso compound" or "lower crystallinity p-PDNB") and typically has a greater amount of finer particulates (i.e., less than 1 micrometer) compared to when neutral or acidic media is used to oxidize the BQD. When neutral or acidic media is used in the oxidation of the BQD, a reaction product that is substantially more crystalline ("higher crystallinity polynitroso compound" or "higher crystallinity p-PDNB") and has less finer particulates is formed. These processes are further described from col. 1, line 19 to col. 2, line 28 of U.S. Pat. No. 6,600,005, incorporated herein by reference. Higher and lower crystallinity p-PDNB materials are commercially available from Lord Germany Feinchemie GmbH, Germany under the trade names: PPDNB 1A 30X; PPDNB 2A 30X; PPDNB 2A 50W; PPDNB C 50W and PPDNB C30X.

Generally, the higher crystallinity p-PDNB has a crystallinity that is at least 33% by weight of the total weight of the p-PDNB as determined by X-ray diffraction, which is further described in the Examples. Typically, the higher crystallinity p-PDNB has a crystallinity that is at least 35%, 40% or 45% by weight. Generally, the lower crystallinity p-PDNB has a crystallinity of at most 33%. Typically, the lower crystallinity p-PDNB has a crystallinity of at most 30%. Regardless of the particular crystallinities of the p-PDNB, the ratio of the crystallinity of the higher and lower crystallinity p-PDNB is at least 1.25, 1.5 or 1.75.

In a particular embodiment every polynitroso compound present in the adhesive composition is selected from the polymeric form of p-dinitrosobenzene, the polymeric form of 1,4-dinitrosonaphthalene, and mixtures thereof, wherein at least one has higher crystallinity and another one has lower crystallinity. In a particular embodiment, every polynitroso compound present in the adhesive composition is the polymeric form of p-dinitrosobenzene, in which the polymeric form of p-dinitrosobenzene is present in a lower crystallinity form and a higher crystallinity form. Desirably the lower crystallinity polynitroso compound and the higher crystallinity polynitroso compound are provided in a weight ratio of 1/2 to 2/1 or 1.1/1 to 1/1.1.

The adhesive composition may contain other components such as fillers known in the rubber art including, for example, carbon black, fumed silica, clay and other inorganic particulates. The amount of filler may be from about 2 PHR, 5 PHR or 8 PHR to 30 PHR, 25 PHR or 15 PHR. The adhesive composition may contain further oxidizers or crosslinkers, but are not necessary and preferably are in the absence of these. The adhesive composition may contain an anti-corrosion pigment such as lead oxide, zinc oxide, molybdate modified zinc oxide. The amount of anti-corrosion pigment, when present, may be present in an amount of 2 PHR, 5 PHR or 8 PHR to 30 PHR, 25 PHR or 15 PHR.

The adhesive composition may be made by mixing the components of the adhesive composition in any suitable mixing method such as those known in the art. Exemplary methods include ball milling, attrition milling, ribbon blending, high shear mixing (e.g., colloid mills) and paddle mixing.

When bonding the substrate to the rubber, the adhesive composition may be applied to the substrate, unvulcanized rubber or both by any suitable means such as spraying, dipping or brushing. The carrier liquid is then removed by any suitable method such as drying, which may be at ambient conditions or heated to a temperature below where the adhesive composition will react (vulcanize). Typical temperatures may be from about 25° C. to 100° C. Any suitable time may be used and is readily determined and exemplary times may be a few minutes to several days. To facilitate quicker drying a vacuum or a flowing atmosphere may be used. The interposing of the adhesive composition between the substrate and unvulcanized rubber may occur any time after applying the coating of the adhesive composition. The method of interposing may be any suitable such that there is contact with both the substrate and rubber such that the adhesive coating interposed between them, which may be in direct contact or through one or more primer layers that may be optionally employed. Any primer layer, if employed, may be any suitable one such as those known in the art.

The assemblage of the substrate, rubber and interposed adhesive composition is then heated to a temperature for a time to vulcanize the rubber and adhesive composition thereby bonding the rubber to the substrate. The temperature may be any suitable temperature depending on the rubber being used and desired properties, which is readily determined. The time likewise, may be any suitable time depending on the rubber used and desired properties. An applied pressure may also be employed as desired. Illustrative, typical temperatures for vulcanization are from 120° C. or 140° C. to 200° C. or 250° C. The time at temperature may be for 2 or 3 seconds or several days depending on the particular application and tends to depend on the size of the particular assemblage.

EXAMPLES

The ingredients used in the following Examples and Comparative Examples are shown in Table 1. In Tables 2 and 3 are the natural rubber compositions bonded by the adhesive compositions.

TABLE 1

| Ingredient | Description | Trade Name | Company |
|---|---|---|---|
| Polychloroprene | Polychloroprene latex (ca. 47% in water) | Neoprene 115 | DuPont |
| p-PDNB | Lower Crystallinity Poly-(1,4-phenyleneazine N,N-dioxide). | PPDNB 2A 50W | Lord Feinchemie GmbH (Lord) |
| p-PDNB | Higher Crystallinity Poly-(1,4-phenyleneazine N,N-dioxide). | PPDNB C 50W | Lord Feinchemie GmbH |
| Carbon Black | Filler for adhesive | N 772 | Evonik |
| Nonyl phenol ethoxylate | Nonionic Surfactant | Igepal CO 630 | Solvay |
| Sulfosuccinic acid diisooctyl ester, sodium salt | Anionic Surfactant | Triumphnetzer ZSG | Zschimmer & Schwarz |
| Polyvinyl alcohol | | Poval | Kuraray |
| Natural Rubber | | SMR 5CV 60 | Weber & Schaer |
| Stearic Acid | | | Sigma Aldrich |
| Zinc Oxide | Filler for adhesive and rubber | Zinc Oxide Red Seal | Grillo |
| Aromatic oil | Plasticizer | Naftolen ZD | Chemetall |

TABLE 1-continued

| Ingredient | Description | Trade Name | Company |
|---|---|---|---|
| Carbon Black | Filler for rubber | N-220 | Evonik |
| N-Isopropyl-N'-phenyl-4-phenylenediamine (IPPD) | Antidegradant for rubber | Vulkanox 4010 NA | Lanxess |
| Sulfur | | | Salfic Alcan |
| N-cyclohexyl-2-benzothiazyl sulfenamide | Curing accelerator for the vulcanization of natural and synthetic rubber | Rhenogran CBS | RheinChemie |
| Paraffinic mineral oil | Plasticizer | Naftolen P 611 | Chemetall |
| Mercaptobenzothiazole | Multi-purpose accelerator for the vulcanization of natural and synthetic rubber | Rhenogran MBT | RheinChemie |
| Dibenzothiazole disulfide | Versatile accelerator for the vulcanization of natural and synthetic rubber | Rhenogran MBTS | RheinChemie |
| Primer | Primer | MEGUM W 23500 | Dow |
| Brominated 2,3 dichorlobutadiene | Polymer latex based on brominated 2,3 dichlorobutadiene (ca. 40% in water) | Intermediate B-48 | Dow |
| Chlorosulfonated polyolefin | Chlorosulfonated polyolefin latex (ca. 30% in water) | Thixon B-4 | Dow |

TABLE 2

Natural Rubber 65 Shore A Composition ("NR-65")

| Constituents | Contents in parts by Weight |
|---|---|
| Natural rubber SMR 5 CV 60 | 100 |
| Stearic acid | 2.5 |
| ZnO | 5.0 |
| Naftolen ZD | 2.0 |
| carbon black N 220 | 50 |
| IPPD Vulkanox 4010 NA | 0.4 |
| Sulfur | 2.6 |
| Rhenogran CBS | 0.5 |

TABLE 3

Natural Rubber 45 Shore A Composition ("NR-45")

| Constituents | Contents in parts by Weight |
|---|---|
| Natural rubber SMR 5 CV 60 | 100 |
| Stearic acid | 2.0 |
| ZnO | 5.0 |
| Ultrasil VN 3 | 2.0 |
| carbon black N 330 | 25 |
| IPPD Vulkanox 4010 NA | 1.4 |
| Naftolen P 611 | 6.0 |
| Rhenogran MBT | 0.3 |
| Rhenogran MBTS | 0.95 |
| Sulfur | 2.5 |

The crystallinity of the higher and lower crystallinity Poly-(1,4-phenyleneazine N,N-dioxide) was determined as follows. The analysis was performed using a Bruker D8 Advance θ-θ X-ray diffractometer equipped with a copper sealed-source tube and Vantec-1 linear position sensitive detector was used to collect diffraction patterns. The tube was operated at 35 kV and 45 mA and the samples were illuminated with copper Kα radiation ($\lambda = 1.541$ Å). XRD data were collected with a 3° detector window from 5° to 75° 2θ, with a step size of 0.026° and 1 s/step collection times. Analysis of the resulting X-ray diffraction patterns was performed using JADE 2010 X-ray diffraction analysis software from Materials Data Inc.

The percent by weight of crystalline material in the poly-(1,4-phenyleneazine N,N-dioxide) was determined by letting each of the suspensions settle until reaching an equilibrium (no observable further settling by eye). A first sample was drawn from the cloudy supernatant over the settled material. An X-ray diffraction pattern was determined for this material, which resulted in a broad X-ray diffraction pattern typical of an amorphous or very fine material with a couple of smaller distinct peaks. This diffraction pattern was used as an end point representative of an amorphous poly-(1,4-phenyleneazine N,N-dioxide), in which the distinct peaks were ignored in the analysis.

Figure 4:
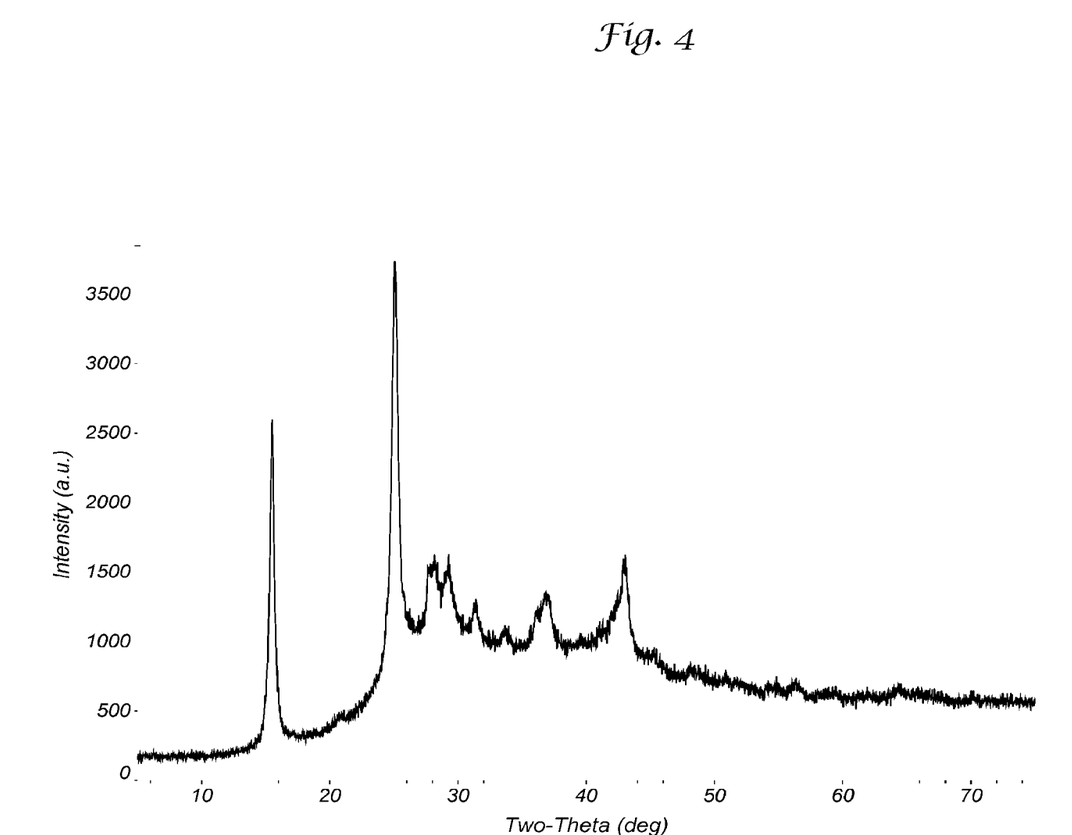
FIG. 4 is an X-ray diffraction pattern of the lower crystallinity p-PDNB shown in FIG. 2.

A second sample was drawn from the settled material. This sample was further subject to filtration to form a paste, but not dried since the material tends to be unstable when completely dried. An X-ray diffraction pattern was determined for this second sample (see FIG. 3). A whole-pattern fitting over the whole diffraction pattern, where a d spacing intensity list was generated from the first (cloudy supernatant) and second (settled material) sample diffraction patterns was performed. These lists were then used to determine the weight percent of the crystalline portion in the second sample (settled material). Since the amount of crystalline material in the cloudy liquid over the settled cake was de minimis, it was deemed irrelevant in determining the total amount of crystalline material in the bulk of the poly-(1,4-phenyleneazine N,N-dioxide). The higher crystallinity p-PDNB had a crystalline weight % of 48.6%±0.9% (tradename of PPDNB C50W available from Lord, FIG. 3). For each of the other poly-(1,4-phenyleneazine N,N-dioxide) samples, the X-ray diffraction pattern of its settled material was determined and the weight percent of crystalline material determined using the previously generated d spacing intensity lists again using whole pattern fitting. The lower crystallinity p-PDNB had a crystalline weight % of 26.8%±0.6% (tradename of PPDNB 2A50W, available from Lord). FIG. 4 shows the diffraction pattern of the 2A50W settled material.

Example 1 and Comparative Examples 1 and 2

The ingredients shown in Table 4 were ball milled together for about 2 h using aqueous media. The viscosity of these adhesive compositions were determined according to ASTM-D2196 (Brookfield) and DIN 53211 but with a DIN 3 cup (3 mm orifice diameter) and the results are also shown in Table 4.

TABLE 4

| Ingredient | Comp. Ex. 1 | Example 1 Weight [g] | Comp. Ex. 2 |
| --- | --- | --- | --- |
| polychloroprene (ca. 47% in water by weight) | 277.9 | 277.9 | 277.9 |
| p-PDNB lower crystallinity (ca. 50% in water by weight) | 176.8 | 88.4 | — |
| p-PDNB higher crystallinity (ca. 50% in water by weight) | — | 88.4 | 176.8 |
| carbon black | 51.6 | 51.6 | 51.6 |
| nonionic surfactant | 10.6 | 10.6 | 10.6 |
| anionic surfactant | 1.2 | 1.2 | 1.2 |
| polyvinyl alcohol | 0.9 | 0.9 | 0.9 |

TABLE 4-continued

| Ingredient | Comp. Ex. 1 | Example 1 Weight [g] | Comp. Ex. 2 |
| --- | --- | --- | --- |
| deionized water | 481 | 481 | 481 |
| Viscosity (DIN 3, 20° C.) [s] | 43 | 30 | 24 |
| Brookfield LV II, 30 rpm, 20° C. (mPa · s) | 345 | 170 | 30 |

These adhesive compositions were used to bond metal buffers as described in WDK Guideline 2000 and the natural rubbers NR-65 as follows.

Bonded parts are pulled to destruction after curing (vulcanization) according to tensile test procedure in WDK Guideline 2000 (related to ASTM D 429 F) and the fracture pattern in the rubber % was determined by visual assessment (herein "% R). To perform the test, buffers were cleaned and grit blasted. The preheated (40-80° C.) metal surface was primed with Megum™ W 23500 by spraying application to a thickness of about 8 μm to 15 μm. The primer layer was dried at 80° C. for 15 minutes. Then the primed steel parts were coated with the adhesive composition by spraying application to a thickness of 15 μm to 40 μm and dried again at 80° C. for 8 minutes. The coated buffers were then bonded to a natural rubber NR-65 by transfer molding the rubber on the coated metal parts at 160° C. (heated vulcanization press) for 10 minutes (NR-65). The characteristic tensile test was performed after cooling over night at room temperature. The bonding characteristics of these adhesive compositions are shown in Table 5.

TABLE 5

| | Comp. Ex. 1 | Example 1 | Comp. Ex. 2 |
| --- | --- | --- | --- |
| Adhesive Strength [MPa] NR-65 | 10.6 | 12.2 | 10.9 |
| Fracture pattern in rubber [% R] NR-65 | 97 | 98 | 98 |

From the results shown in Table 5, Example 1 has a substantially higher bond strength than the Comparative Examples 1 and 2. This is completely and utterly unexpected.

Example 2 and Comparative Examples 3 and 4

Adhesive compositions were made in the same way as described for Example 1 except that the compositions were as shown in Table 6.

TABLE 6

| Ingredient | Comp. Ex. 3 | Example 2 Weight [g] | Comp. Ex. 4 |
| --- | --- | --- | --- |
| brominated 2,3 dichlorobutadiene | 368.3 | 368.3 | 368.3 |
| p-PDNB lower crystallinity (ca. 50% in water) | 176.8 | 88.4 | — |
| p-PDNB higher crystallinity (ca. 50% in water) | — | 88.4 | 176.8 |
| carbon black | 51.6 | 51.6 | 51.6 |
| nonionic surfactant | 10.6 | 10.6 | 10.6 |
| anionic surfactant | 1.2 | 1.2 | 1.2 |
| polyvinyl alcohol | 0.9 | 0.9 | 0.9 |
| deionized water | 390.7 | 390.7 | 390.7 |

The adhesion properties of the adhesive compositions were tested in the same manner as described for Example 1. The cure used for the NR-65 was also the same as described for Example 1. The cure used when testing the adhesion properties of NR-45 was the same as described for Example 1 with a curing time of 8 min at 160° C.

The adhesion properties were also tested using a prebake. The prebake was performed as follows. The coated metal parts were preheated in a drying oven at the curing temperature (160° C.) for a selected time and then transferred immediately in the vulcanization press, where the parts were bonded to a natural rubber NR-65 or NR-45 by transfer molding. The cure used was the same as described for Example 1. The adhesion properties of these adhesive composition are shown in Table 7.

TABLE 7

|  | prebake | Comp. Ex. 3 | Example 2 | Comp. Ex. 4 |
|---|---|---|---|---|
| Adhesion Strength [MPa] NR-65 | 0 min | 11.8 | 11.7 | 9.8 |
| Fracture pattern in rubber [% R] NR-65 | 0 min | 95 | 96 | 99 |
| Adhesion Strength [MPa] NR-65 | 5 min | 9.6 | 12.1 | 10.5 |
| Fracture pattern in rubber [% R] NR-65 | 5 min | 92 | 94 | 95 |
| Adhesion Strength [MPa] NR-45 | 0 min | 8.6 | 11.9 | 11.6 |
| Fracture pattern in rubber [% R] NR-45 | 0 min | 80 | 94 | 94 |
| Adhesion Strength [MPa] NR-45 | 5 min | 8.9 | 11.4 | 11.5 |
| Fracture pattern in rubber [% R] NR-45 | 5 min | 83 | 91 | 88 |

Examples 3 and 4 and Comparative Examples 5-8

The adhesive compositions were made in the same way as described for Example 2 except that the compositions were as shown in Table 8.

TABLE 8

| Ingredient | Comp. Ex. 5 | Example 3 | Comp. Ex. 6 | Comp. Ex. 7 | Example 4 | Comp. Ex. 8 |
|---|---|---|---|---|---|---|
|  | Weight [g] | | | | | |
| chlorosulfonated polyolefin (ca. 30% in water) | 208.2 | 208.2 | 208.2 | 624.6 | 624.6 | 624.6 |
| p-PDNB lower crystallinity (ca. 50% in water) | 176.8 | 88.4 | — | 176.8 | 88.4 | — |
| p-PDNB higher crystallinity (ca. 50% in water) | — | 88.4 | 176.8 | — | 88.4 | 176.8 |
| carbon black | 51.6 | 51.6 | 51.6 | 51.6 | 51.6 | 51.6 |
| nonionic surfactant | 10.6 | 10.6 | 10.6 | 10.6 | 10.6 | 10.6 |
| anionic surfactant | 1.2 | 1.2 | 1.2 | 1.2 | 1.2 | 1.2 |
| polyvinyl alcohol | 0.9 | 0.9 | 0.9 | 0.9 | 0.9 | 0.9 |
| deionized water | 550.7 | 550.7 | 550.7 | 134.3 | 134.3 | 134.3 |

The adhesion properties of the adhesive compositions were tested in the same manner as described for Example 2. The curing and prebake used were the same as described for Example 2. The results are shown in Table 9

TABLE 9

|  | prebake | Comp. Ex. 5 | Ex. 3 | Comp. Ex. 6 | Comp. Ex. 7 | Ex. 4 | Comp. Ex. 8 |
|---|---|---|---|---|---|---|---|
| Adhesion Strength [MPa] NR-65 | 0 min | 9.0 | 9.3 | 8.3 | 10.1 | 10 | 10 |
| Fracture pattern in rubber [% R] NR-65 | 0 min | 93 | 95 | 96 | 95 | 95 | 97 |
| Adhesion Strength [MPa] NR-65 | 5 min | 9.7 | 9.7 | 8.6 | 10.5 | 10.2 | 9.4 |
| Fracture pattern in rubber [% R] NR-65 | 5 min | 95 | 97 | 91 | 98 | 98 | 97 |
| Adhesion Strength [MPa] NR-45 | 0 min | 9.2 | 10.2 | 9.2 | 8.9 | 9.7 | 9.2 |
| Fracture pattern in rubber [% R] NR-45 | 0 min | 95 | 93 | 96 | 92 | 96 | 93 |
| Adhesion Strength [MPa] NR-45 | 5 min | 8.5 | 9.5 | 8.7 | 5.7 | 10.3 | 8.0 |
| Fracture pattern in rubber [% R] NR-45 | 5 min | 85 | 91 | 93 | 98 | 94 | 85 |

Examples 5-9 and Comparative Examples 9 and 10

These adhesive compositions were made in the same manner as Example 3 except that the compositions were as shown in Table 10. The adhesion properties of these adhesive compositions were tested in the same manner as described for Example 2. The curing and prebake used were the same as described for Example 2. The results are shown in Table 11

TABLE 10

| Ingredient | Comp. Ex. 9 | Ex. 5 | Ex. 6 | Ex. 7 | Ex. 8 | Ex. 9 | Comp. Ex. 10 |
|---|---|---|---|---|---|---|---|
| | | | Weight [g] | | | | |
| chlorosulfonated polyolefin | 418.3 | 418.3 | 418.3 | 418.3 | 418.3 | 418.3 | 418.3 |
| p-PDNB lower crystallinity | 176.8 | 141.4 | 117.9 | 88.4 | 58.9 | 35.4 | — |
| p-PDNB higher crystallinity | — | 35.4 | 58.9 | 88.4 | 117.9 | 141.4 | 176.8 |
| carbon black | 51.6 | 51.6 | 51.6 | 51.6 | 51.6 | 51.6 | 51.6 |
| nonionic surfactant | 10.6 | 10.6 | 10.6 | 10.6 | 10.6 | 10.6 | 10.6 |
| anionic surfactant | 1.2 | 1.2 | 1.2 | 1.2 | 1.2 | 1.2 | 1.2 |
| polyvinyl alcohol | 0.9 | 0.9 | 0.9 | 0.9 | 0.9 | 0.9 | 0.9 |
| deionized water | 340.6 | 340.6 | 340.6 | 340.6 | 340.6 | 340.6 | 340.6 |

TABLE 11

| | prebake | Comp. Ex. 9 | Ex. 5 | Ex. 6 | Ex. 7 | Ex. 8 | Ex. 9 | Comp. Ex. 10 |
|---|---|---|---|---|---|---|---|---|
| Adhesion Strength [MPa] NR-65 | 0 min | 10.3 | 9.0 | 9.6 | 9.7 | 8.1 | 7.8 | 8.0 |
| Fracture pattern in rubber [% R] NR-65 | 0 min | 96 | 91 | 93 | 96 | 91 | 91 | 97 |
| Adhesion Strength [MPa] NR-65 | 5 min | 10.4 | 9.0 | 9.6 | 10.3 | 10.5 | 10.5 | 9.7 |
| Fracture pattern in rubber [% R] NR-65 | 5 min | 95 | 93 | 97 | 96 | 97 | 96 | 97 |
| Adhesion Strength [MPa] NR (45 Shore A) | 0 min | 9.4 | 9.3 | 9.7 | 10.2 | 10.1 | 9.8 | 9 |
| Fracture pattern in rubber [% R] NR-45 | 0 min | 92 | 95 | 96 | 93 | 97 | 95 | 90 |
| Adhesion Strength [MPa] NR-45 | 5 min | 9.2 | 9.0 | 9.4 | 10.3 | 10.1 | 10 | 9.5 |
| Fracture pattern in rubber [% R] NR-45 | 5 min | 88 | 95 | 94 | 93 | 97 | 95 | 94 |

What is claimed is:

1. An adhesive composition comprising, (i) a film forming polymer, (ii) a lower crystallinity polynitroso compound having a crystallinity of less than 30% by weight as determined by X-ray diffraction and, (iii) a higher crystallinity polynitroso compound having a crystallinity of at least 35% by weight as determined by X-ray diffraction, and (iv) a carrier liquid.

2. The composition of claim 1, wherein the film forming polymer is a halogenated olefin polymer.

3. The composition of claim 1, wherein the film forming polymer is a halogenated substituted polydiene polymer.

4. The composition of claim 1, wherein (ii) and (iii) components of the composition are provided in a lower crystallinity/higher crystallinity weight ratio of 1/2 to 2/1.

5. The composition of claim 4, wherein the lower crystallinity/higher crystallinity weight ratio is 1.1/1 to 1/1.1.

6. The composition of claim 1, wherein the lower crystallinity polynitroso compound is a lower crystallinity poly-(1,4-phenylenazine-N,N-dioxide).

7. The composition of claim 1, wherein the higher crystallinity polynitroso compound is a higher crystallinity poly-(1,4-phenylenazine-N,N-dioxide).

8. The composition of claim 1, wherein the liquid carrier is comprised of water.

9. The composition of claim 8, wherein the adhesive composition is further comprised of a surfactant.

10. The composition of claim 9, wherein the surfactant is comprised of at least one of an anionic surfactant, cationic surfactant, nonionic surfactant and amphoteric surfactant.

11. The composition of claim 10, wherein the surfactant is selected from the group consisting of the anionic surfactant, nonionic surfactant and combinations thereof.

12. The composition of claim 1, wherein component (ii) has a crystallinity of less than 30% by weight as determined by X-ray diffraction and component (iii) has crystallinity of greater than 40% by weight as determined by X-ray diffraction.

13. The composition of claim 12, wherein the lower and higher crystallinity polynitroso compounds are poly-(1,4-phenylenazine-N,N-dioxide).

14. A method of bonding a substrate to rubber comprising,
(i) applying a coating of the adhesive composition of claim 1 to a substrate, unvulcanized rubber or both,
(ii) removing the carrier liquid to form an adhesive coating on the substrate, unvulcanized rubber or both,
(iii) interposing the adhesive coating between the substrate and unvulcanized rubber forming an assemblage, and
(iv) heating the assemblage to a vulcanization temperature and for a time sufficient to vulcanize the unvulcanized rubber and the adhesive coating thereby bonding the rubber to the substrate.

15. The method of claim 14, wherein the substrate is a metal.

16. The method of claim 14, wherein the rubber is a natural rubber, synthetic rubber or combinations thereof.

17. The method of claim 16, wherein the rubber is natural rubber.

18. The method of claim 16, wherein the rubber is a synthetic rubber selected from the group consisting of polybutadiene, neoprene, butyl rubber, polyisoprene, nitrile rubbers, styrene butadiene rubbers, or ethylene propylene diene based rubbers.

19. A composite article comprising the assemblage after heating of claim 14.

20. The article of claim 19, wherein the substrate is a metal and the article is an article for damping noise, vibration or harshness.

21. The article of claim 20, wherein the article is an automotive component.

\* \* \* \* \*